(12) United States Patent
Link, II et al.

(10) Patent No.: US 6,735,457 B1
(45) Date of Patent: May 11, 2004

(54) AUTOMATIC NUMBER CAPTURE

(75) Inventors: Charles M. Link, II, Roswell, GA (US); Donna M. Post, Atlanta, GA (US); Ursula White, Woodstock, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/471,314

(22) Filed: Dec. 23, 1999

(51) Int. Cl.$^7$ .............................. H04M 1/00; H04Q 7/00
(52) U.S. Cl. ................... 455/575.1; 455/418; 455/425; 455/401; 379/1; 379/32.04; 379/58
(58) Field of Search ................................ 455/564, 565, 455/418–419, 550.1, 575.1, 424, 425, 556.1, 515, 401, 3.05, 3.03, 11.01, 130, 168.1; 379/2–3, 1, 32.04, 37, 34, 39, 40, 58, 59

(56) References Cited

U.S. PATENT DOCUMENTS

| | | | |
|---|---|---|---|
| 4,977,399 A | * 12/1990 | Price et al. | 340/7.21 |
| 5,530,736 A | * 6/1996 | Comer et al. | 455/458 |
| 5,894,596 A | * 4/1999 | Hayes, Jr. | 455/418 |
| 6,151,500 A | * 11/2000 | Cardina et al. | 455/435.2 |
| 6,259,931 B1 | * 7/2001 | Singh | 455/553.1 |
| 6,411,802 B1 | * 6/2002 | Cardina et al. | 455/424 |
| 6,411,808 B1 | * 6/2002 | Adachi et al. | 455/434 |

OTHER PUBLICATIONS

Application diagram available at http://www.rohm.co.jp/products/shortform/02com/2tell.html on Feb. 29, 2000 for a DTMF receiver manufactured by Rohm Co., Ltd, p. 1.

Corporate address of Rohm Co., Ltd., available on Feb. 29, 2000 at http://www.rohm.co.jp/corporate/rohm.html, p. 1.

General description of Mitel 8870D and Mitel 8870D–1 integrated DTMF receivers available on Feb. 29, 2000 at http://www.mitelsemi.com/products/jpg/, pp. 1–2.

Application note MSAN–108 for the Mitel 8870 integrated DTMF receiver obtained from http://www.mitelsemi.com/products/jpg on Feb. 29, 2000, pp. A–45 through A–66.

* cited by examiner

Primary Examiner—Sinh Tran
Assistant Examiner—Kamran Afshar
(74) Attorney, Agent, or Firm—Kirkpatrick & Lockhart LLP (57) ABSTRACT

A wireless telephone comprising a receiver to receive a DTMF (dual tone multi-frequency) audio tone transmitted to the wireless telephone during a conversation mode of the wireless telephone, and a DTMF decoder coupled to the receiver to decode the DTMF audio tone and to responsively generate a decoded signal representing dialed information corresponding to the DTMF audio tone during the conversation mode of the wireless telephone. A wireline telephone may also include a DTMF decoder and a memory to decode and store received DTMF digits. A telephone embodying the present invention thus captures for its user the telephone numbers or other numerical information transmitted by the opposite party in the DTMF form during a conversation, without requiring the user to disrupt the conversation, e.g., by looking for a paper and pen. Thus, the user may not need to personally remember or write down the telephone number or other numerical information received while the user is on phone.

22 Claims, 7 Drawing Sheets

AUTOMATIC NUMBER CAPTURE

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Field of the Invention

The present invention broadly relates to telecommunication devices, and more particularly, to a telephone instrument that automatically captures and stores numbers received in DTMF (dual tone multi-frequency) audio tone format.

2. Description of the Related Art

Telephone communication has seen a phenomenal growth since its inception because of its extreme usefulness in today's world. It is hard, and almost impossible, to conceive a world without telephones. Telephones have almost become an integral part of a civilized society. Various advances in telephone technology have catered to human communication needs and provided many useful features in modem phones. Such features include, for example, the volume control feature, the speed-dial memory feature, the call HOLD feature, the call FORWARD feature, the MUTE feature, the SPEAKERPHONE feature, the TONE/PULSE dialing option etc. Compact sizes and feature-packed designs of modem cordless telephone handsets as well as modem wireless telephone handsets are direct results of advances in integrated circuit fabrication technology. Furthermore, compact designs of many ancillary devices have also allowed their integration into telephones. For example, some modem telephones come equipped with a built-in answering machine or a built-in pager or a calling name display unit (which displays, e.g., the name and telephone number of the calling party).

It is worth noting, however, that human ingenuity still fails, in numerous situations, to solve some of the simple problems associated with the fruits of the technological advances it was employed to bring forth. For example, as mentioned above, a modern telephone device greatly simplifies human communication needs. However, the same telephone device becomes a mute spectator when its operator helplessly tries to locate a paper and a pen or pencil to jot down a telephone number spoken by the opposite party during conversation or heard on a telephone answering service. This problem is exacerbated when that telephone device is a wireless telephone, e.g., a car phone. The car driver, who is also usually the operator of the car phone, has to concentrate not only on the road, but also on the conversation with the other party. The situation worsens when the driver has to search for a writing pad/paper and a pen just to write down a few digits while driving the car and conversing with the other party on the car phone. A car phone is not typically equipped with a speakerphone. However, even if a speakerphone is available or an optional car kit allows for hands-free operation, the driver may still need to search for a pen or a paper. Furthermore, a stick-shift car (i.e., a car with standard transmission as opposed to a car with automatic transmission) may pose additional problems to the driver struggling to take care of a number of tasks simultaneously. In such a situation, the benefits of a car phone (e.g., its compact size, its ease of use, etc.) may simply fail to prevent a potential hazard (e.g., an accident) from taking place.

To avoid above-mentioned situation, the legislators may strive to restrict the usage of wireless phones to non-driving automobile occupants or to people who are not operating an automobile, e.g., pedestrians. However, this may not be a preferable solution for wireless service providers and users alike.

It is therefore desirable to address the problem of taking down messages and call back numbers, especially while driving.

SUMMARY OF THE INVENTION

The present invention contemplates a method and apparatus for receiving, recording and providing to a telephone user information, such as a telephone number provided by another party to the telephone conversation, without requiring the telephone user to disrupt the phone conversation, for example, by searching for a paper and pen. In one embodiment, the present invention is a wireless telephone that includes a receiver to receive a DTMF (dual tone multi-frequency) audio tone transmitted to the wireless telephone during a conversation mode of the wireless telephone, and a DTMF decoder coupled to the receiver to decode the DTMF audio tone and to responsively generate a decoded signal representing dialed information corresponding to the DTMF audio tone during the conversation mode of the wireless telephone. The wireless telephone may be an analog wireless telephone or a digital wireless telephone.

In another embodiment, the present invention is a telephone instrument that includes a receiver to receive a DTMF audio tone transmitted to the telephone instrument during a conversation mode thereof, a DTMF decoder coupled to the receiver to decode the DTMF audio tone and to responsively generate a decoded signal representing a telephone keypad entry conveyed through the DTMF audio tone during the conversation mode of the telephone instrument, a control unit coupled to the DTMF decoder to determine the telephone keypad entry from the decoded signal during the conversation mode of the telephone instrument, and a memory coupled to the control unit to store during the conversation mode of the telephone instrument the telephone keypad entry therein when the telephone keypad entry is a digit.

The present invention also contemplates a method of receiving numerical data in a telephone. The method includes the telephone receiving the numerical data in a DTMF form during a conversation mode thereof, the telephone decoding the numerical data received in the DTMF form during the conversation mode thereof, and the telephone storing therein the numerical data during the conversation mode thereof.

A telephone embodying the present invention thus captures for its user the telephone numbers or other numerical information transmitted by the opposite party in the DTMF form during a conversation, without requiring the user to disrupt the conversation, e.g., by looking for a paper and pen. Thus, the user may not need to personally remember or write down the telephone number or other numerical information received while the user is on phone. The user may also place a call to the captured telephone number by directly dialing that number from its storage location in the phone, i.e., without the user manually entering the complete number.

BRIEF DESCRIPTION OF THE DRAWINGS

Further advantages of the present invention may be better understood by referring to the following description taken in conjunction with the accompanying drawings, in which.

DETAILED DESCRIPTION OF PREFERRED EMBODIMENTS

Figures 1, 2:
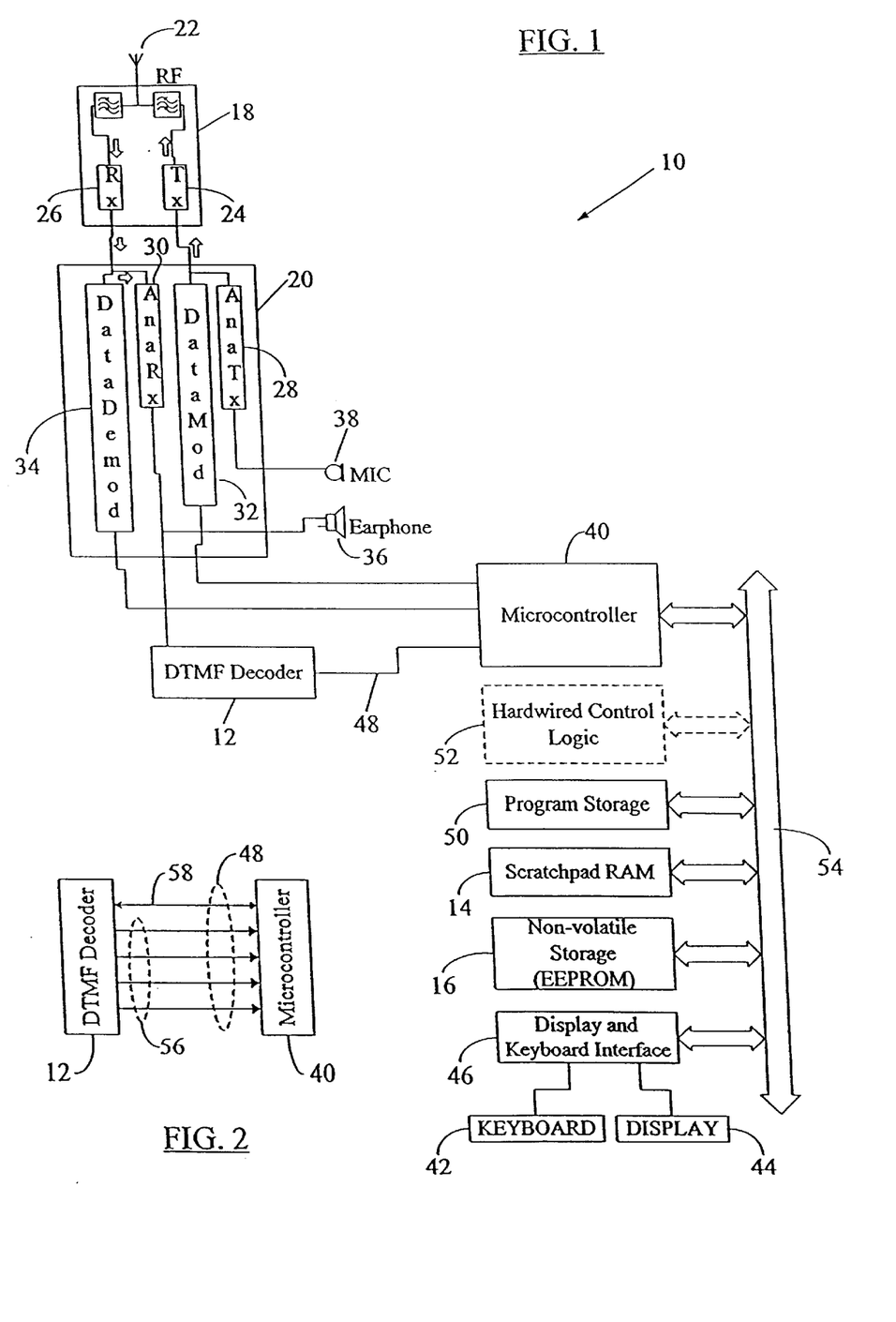
FIG. 1 shows an internal block diagram of an analog wireless telephone with built-in DTMF decoder and memory storage to automatically capture and store DTMF digits received by the phone.
FIG. 2 illustrates an exemplary architecture of the DTMF decoder output bus.

Referring now to FIG. 1, an internal block diagram of an analog wireless telephone (AWT) 10 with built-in AWT DTMF decoder 12 and AWT memory storage such as an AWT scratchpad RAM 14 and an AWT non-volatile memory storage 16 to automatically capture and store DTMF digits received by the AWT 10 is illustrated. The analog wireless telephone 10 includes an AWT RF (radio frequency) transceiver unit 18 and an AWT modulator-demodulator unit 20 to transmit and receive telephone signals in a wireless network, e.g., the AMPS (advanced mobile phone system) cellular system. The AWT RF transceiver unit 18 may typically include an AWT RF antenna 22, an AWT RF transmitter amplifier 24 and an AWT RF receiver amplifier 26 to establish a telephone communication over an RF channel, e.g., an 800-MHz RF channel. The AWT modulator-demodulator unit 20 may include an AWT analog modulator 28 and an AWT analog demodulator 30 to respectively modulate and demodulate audio speech signals transmitted and received over a voice channel established between the AWT 10 and a base station (not shown) in a cellular network. Additionally, the AWT modulator-demodulator 20 may include an AWT data modulator 32 and an AWT data demodulator 34 to respectively modulate and demodulate control channel information to establish and maintain contact with a base station in a cellular network.

The voice channel audio information is transmitted via the AWT analog modulator 28, whereas the control channel information uses the AWT data modulator 32. Both of these modulated signals are then combined and transmitted to the base station (BS) using the AWT RF transmitter amplifier 24 (and any necessary filters) and the AWT RF antenna 22. It is noted that the AWT data modulator 32 may also transmit signaling information—the information that allows a mobile phone to communicate with a cellular system—for the control channel as well as for the voice channel. In an AMPS system, for example, the control channel signaling may be all digital messages, whereas the voice channel signaling may include digital messages as well as audio tones. The AWT analog modulator 28 may employ frequency modulation for voice channel speech signals as well as for certain audio tones transmitted as part of voice channel signaling information. The AWT data modulator 32, on the other hand, may use frequency shift keying (FSK) to modulate control channel information as well as to modulate certain voice channel signaling messages.

The reverse operations are performed during reception of control and voice channel information through the AWT RF antenna 22. After filtering and necessary RF amplification by the AWT RF receiver amplifier 26, the received control channel information along with pertinent voice channel signaling messages is demodulated by the AWT data demodulator 34; whereas, the voice channel information (including speech signals and certain audio signaling tones) is demodulated by the AWT analog demodulator 30. The demodulated speech signals are then fed to a built-in AWT earphone 36, which enables the operator of the AWT 10 to hear the voice of the party at the opposite end of the telephone "link."

After the AWT 10 is assigned a voice channel by the BS (not shown) in the relevant cellular network, the AWT 10 may be considered to have entered its "conversation mode", during which the operator of the AWT 10 may perform a telephone conversation with the opposite party. The speech of the AWT operator is received by a built-in AWT microphone 38, which converts the audio speech into corresponding electrical signals that are transmitted to the AWT analog modulator 28. The received audio speech from the opposite party is demodulated by the AWT analog demodulator 30 prior to feeding the demodulated signal to the AWT earphone 36 as discussed before. Appropriate signaling information may be transmitted and received under the control of an AWT microcontroller 40 connected to the AWT data modulator 32 and the AWT data demodulator 34.

The AWT microcontroller 40 may also perform other controlling and processing functions, e.g., interpreting user keyboard (also known as "keypad") entries entered through an AWT keyboard 42 and displaying one or more of these entries on an AWT display 44. An AWT display and keyboard interface 46 provides a communication link between the AWT microcontroller 40 and the AWT keyboard 42 and the AWT display 44. A "ROAM" indicator may be displayed on the AWT display 44 when the AWT microcontroller 40 detects that the AWT 10 is placed out of its authorized geographical service area. The AWT microcontroller 40 may also display the calling name information (e.g., the name and telephone number of the calling party) on the AWT display 44 if the user of the AWT 10 has subscribed to such a service. The AWT microcontroller 40 may include a number of logic units or circuit elements (not shown), e.g., one or more temporary storage registers or buffers, bus control logic, control channel information processing unit, etc.

During the conversation mode of the AWT 10, the user may request one or more phone numbers or other numerical information (e.g., date of birth or date of marriage anniversary of a person) from the opposite party. As discussed hereinbefore, presently a user may need to write down the digits spoken over the phone. This may not be convenient for the user, especially when the user does not have immediate access to a paper and a pen or to any other writing instrument. In accordance with the present invention, the AWT 10 includes a built-in AWT DTMF (dual tone multi-frequency) decoder 12 that is coupled to the AWT microcontroller 40 and the AWT analog demodulator 30 as shown in FIG. 1. As is known in the art, each keypad digit (digits "0" to "9") and special symbols ("*" and "#") may be represented using two different audio frequency tones, i.e., using a DTMF signal. Each DTMF signal transmitted by the opposite party is carried over the voice channel assigned by the BS (not shown) to the AWT 10 while the AWT 10 is in its conversation mode.

Upon demodulation of the received DTMF signal, the AWT analog demodulator 30 forwards the demodulated DTMF signal (carrying two audio frequency tones) to the AWT DTMF decoder 12, which, in turn, sends a decoded signal to the AWT microcontroller 40 over an AWT DTMF decoder output bus 48. The decoded signal from the AWT DTMF decoder 12 may carry information about the dialed digit (or symbol) to the AWT microcontroller 40, which may then identify the digit or symbol sent by the opposite party through the DTMF signal and store the received digit in an AWT scratchpad RAM 14 (random access memory) for temporary storage or in an AWT non-volatile memory storage 16, such as an EEPROM (electrically erasable programmable read only memory), under program control. In the embodiment of FIG. 1, the AWT 10 includes an AWT program storage unit 50 to store a program module that interacts with the AWT microcontroller 40 to "interpret" the DTMF symbol(s) received from the opposite party and to instruct the AWT microcontroller 40 where to store the received digits in view of the symbols received as discussed hereinbelow with reference to FIGS. 5–8. The AWT microcontroller 40 may, for example, be configured to display each received digit on the AWT display 44 while storing that digit in the AWT scratchpad RAM 14.

In an another embodiment, the software control functions for DTMF decoder application may be implemented in hardware using an optional AWT hardwired control logic unit 52 (illustrated in FIG. 1 as a block with broken lines) instead of the program module and the AWT program storage unit 50. The hardware implementation of software functions may save power consumption, and may expedite the processing of the information to some extent. On the other hand, a software-based DTMF decoding may allow portability of the software across many wireless communication platforms, e.g., AMPS (advanced mobile phone service), TDMA (time division multiple access), GSM (global system for mobile communications), PCS (personal communications system), etc. Further, the software for the DTMF decoding functionality may be bundled as part of other software for the AWT 10 residing inside or outside of the AWT microcontroller 40.

The AWT scratchpad RAM 14 provides temporary memory storage for the received DTMF digits. In one embodiment, the AWT scratchpad RAM 14 stores ten telephone numbers having sixteen (16) digits each. The AWT microcontroller 40, under the program control, may send an indication (e.g., a visible icon on the AWT display 44 and/or a particular audio tone) to the user upon each completion of the telephone number transmission (using DTMF digits) by the opposite party. The user may interact with the AWT microconroller 40 via the AWT keyboard 42 and the AWT display 44 to instruct the AWT microcontroller 40 whether to keep the number stored in the AWT scratchpad RAM 14 or whether to move the number for permanent storage in the AWT non-volatile memory storage 16. The AWT non-volatile memory storage 16 may, for example, include an EEPROM that may save the received telephone number even in the event of loss of power. The size of the AWT non-volatile memory 16, i.e., the storage capacity of the AWT non-volatile memory 16, may be predetermined by the designer of the AWT 10. The AWT microcontroller 40 may be coupled to the AWT program storage unit 50, the AWT scratchpad RAM 14, the AWT non-volatile memory storage 16 and the AWT display and keyboard interface 46 via a AWT bidirectional signal bus 54 to accomplish desired DTMF decoding and storage functionality.

Turning now to FIG. 2, an exemplary architecture of the AWT DTMF decoder output bus 48 is illustrated. The AWT DTMF decoder output bus 48 may include a 4-bit data bus 56 and a strobe line 58. Four bits of the data bus 56 may be utilized to convey, in different combinations of 0's and 1's, a total of sixteen ($2^4$) binary values. Thus, after decoding, the AWT DTMF decoder 12 may send each received digit (digits "0" through "9") and symbol (symbols "*" and "#") to the microcontroller 40 in a predetermined 4-bit format, e.g., the BCD (binary coded decimal) format. The AWT microcontroller 40 may then determine, such as under program control, which of the twelve keypad entries is received in a given 4-bit data signal over the data bus 56. The strobe line 58 may be used by the AWT DTMF decoder 12 to alert the AWT microcontroller 40 to the stream of decoded DTMF digits transmitted from the AWT DTMF decoder 12. The AWT microcontroller 40 may, in turn, use the strobe line 58 to send an acknowledgement signal or indication to the AWT DTMF decoder 12 upon reception of each decoded 4-bit digit (or symbol) or upon reception of the complete telephone number sent by the opposite party. In one embodiment, the Mitel® 8870 DTMF decoder integrated circuit manufactured by the Mitel Corporation, 350 Legget Drive, Kanata, Ontario, Canada K2K 2W7, is used as the AWT DTMF decoder 12. However, DTMF decoder chips by other manufacturers may also be conveniently used.

Figure 3:
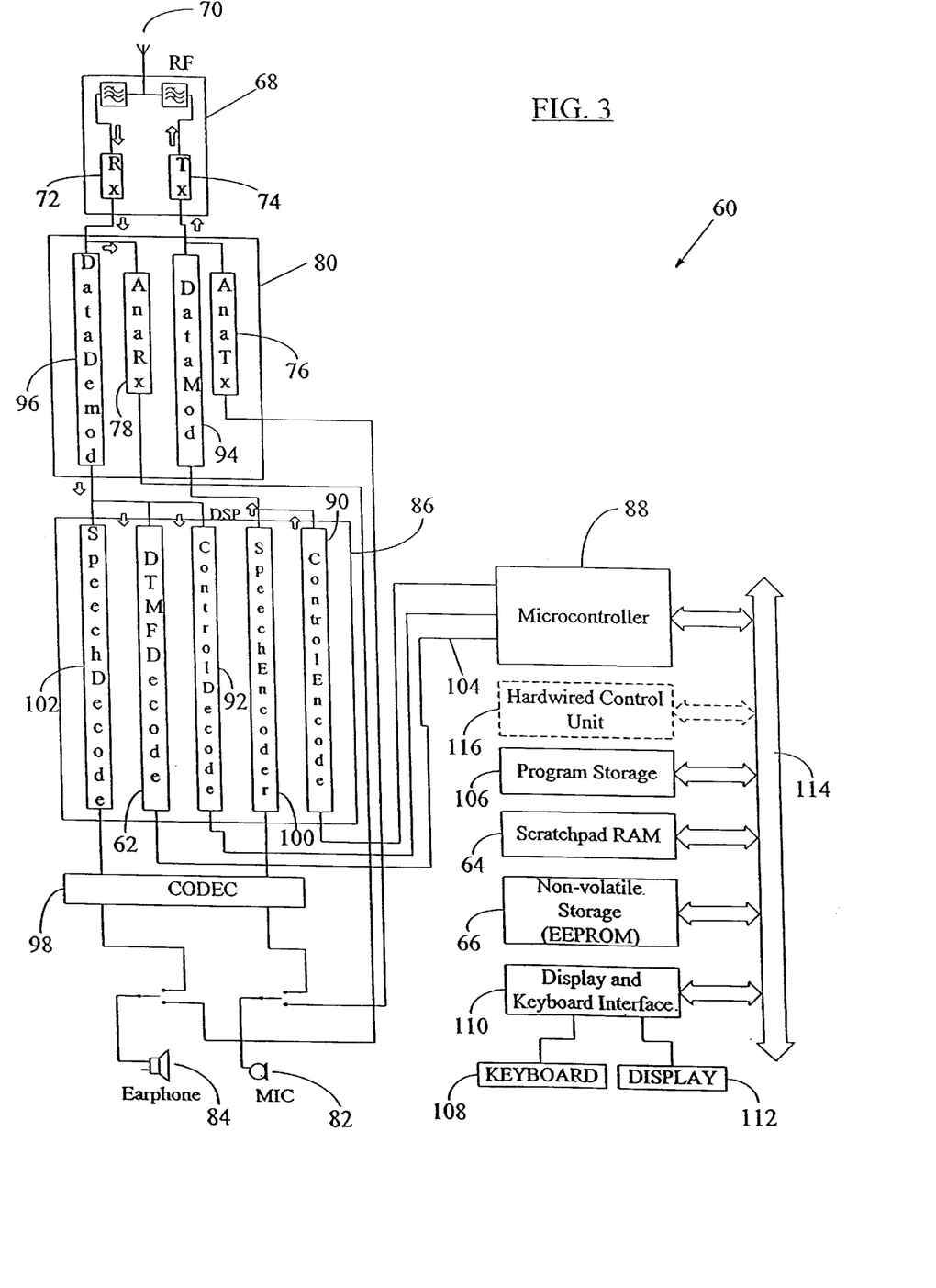
FIG. 3 depicts an internal block diagram of a digital wireless telephone with built-in DTMF decoder and memory storage to automatically capture and store DTMF digits received by the phone.

Referring now to FIG. 3, an internal block diagram of a digital wireless telephone (DWT) 60 with built-in DWT DTMF decoder 62 and DWT memory storage such as a DWT scratchpad RAM 64 and a DWT non-volatile memory storage 66 to automatically capture and store DTMF digits received by the DWT 60 is depicted. The DWT 60 may include a DWT RF transceiver unit 68 having a DWT RF antenna 70, a DWT RF receiver amplifier 72 and a DWT RF transmitter amplifier 74. The DWT RF transceiver unit 68 may function similar to the AWT RF transceiver unit 18. Hence, a further discussion of each of the components in the DWT RF transceiver unit 68 (i.e., the DWT RF antenna 70, the DWT RF receiver amplifier 72 and the DWT RF transmitter amplifier 74) is omitted herein to avoid repetition.

The digital wireless telephone 60 illustrated in FIG. 3 may be a multi-mode phone, i.e., a wireless phone that can function in any wireless communication system including, for example, an analog wireless communication system (e.g., an AMPS system) and a digital wireless communication system (e.g., a TDMA system). Further, it is noted that the DWT 60 may be a multi-band phone also; i.e., the DWT 60 may operate in any range or spectrum of wireless frequencies including, for example, the 800 MHz wireless range and the 1900 MHz wireless range.

The direct connections from a DWT analog modulator 76 and from a DWT analog demodulator 78 in a DWT modulator-demodulator unit 80 to a DWT microphone 82 and a DWT earphone 84 respectively are provided to facilitate operation of the DWT 60 in an analog system. The DWT 60 may automatically switch between an analog system and a digital system. A digital signal processor (DSP) 86 may frequently evaluate received control signals (from corresponding cell sites) to determine whether to operate the DWT 60 in an analog mode or in a digital mode. In an analog mode operation, the DWT 60 may transmit the user's speech directly to the DWT analog modulator 76 and may similarly transfer the received voice signals (over an analog voice channel) from the DWT analog demodulator 78 directly to the DWT earphone 84 in a way similar to that discussed hereinbefore with reference to the AWT 10 in FIG. 1. However, in the analog mode of the DWT 60, the control channel information (including relevant signaling messages) from the DWT microcontroller 88 may still pass through the DSP 86 for appropriate encoding (via the control encoder 90) and decoding (via the control decoder 92) of digital control signals. During transmission in the analog mode, the DSP 86 may send the control signals to the DWT data modulator 94 and then to the DWT RF transmitter amplifier 74. During reception in the analog mode, the control signals received from the DWT RF receiver amplifier 72 are demodulated in the DWT data demodulator 96 prior to being fed to the control decoder 92 in the DSP 86. The DSP 86 then sends the decoded control bits to the DWT microcontroller 88 for further processing.

The DWT 60 enters into a conversation mode when a voice channel is assigned to it by corresponding base station (not shown). In a digital wireless network (e.g., a network operating under IS-136 TDMA standard), the analog speech signal from the DWT microphone 82 is first converted into a digital format, e.g., a PCM (pulse code modulation) format, by a CODEC (coder-decoder) unit 98. The DSP 86 divides the digital output from the CODEC unit 98 into appropriate time slots and then encodes each group of bits via a speech encoder 100. The encoding by the speech encoder 100 may also compress the size of each group of data bits. The DSP 86 encodes via a control encoder 90 any control channel information (including any DTMF audio signaling tones to be transmitted over the digital voice channel) received from a DWT microcontroller 88 and adds the encoded control bits to appropriate group of encoded data bits from the speech encoder 100. The DSP 86 (for example, through the speech encoder 100) may also add error protection to some of the voice data bits. The combined digital control and voice data bits are then modulated by a DWT data modulator 94. In one embodiment, the DWT data modulator 94 is a differential quadrature phase shift keying (DQPSK) modulator. The modulated digital voice and control channel bits are then transmitted via the DWT RF transceiver unit 68 after necessary amplification and filtering through the DWT RF transmitter amplifier 74.

Any digital voice and control channel information received by the DWT RF antenna 70 is first down-converted and amplified by the DWT RF receiver amplifier 72. Thereafter, a DWT data demodulator 96 in the DWT modulator-demodulator unit 80 demodulates the received voice and control channel bits using, for example, a DQPSK demodulation. The DSP 86 receives the demodulated digital voice and control channel bits from the DWT data demodulator 96 and removes the encoding present therein via a speech decoder 102 and a control decoder 92 respectively. The decoded control bits are then sent to the DWT microcontroller 88 for further processing. However, the decoded voice bits are sent to the CODEC unit 98 to reconstruct the analog audio information received through the digital voice bits. The user may then listen to the received audio through the DWT earphone 84.

Similar to the earlier discussion hereinbefore with reference to the AWT 10 in FIG. 1, the DWT 60 may also receive one or more DTMF signals sent by the opposite party during the conversation mode of the DWT 60. The wireless network may carry one or more DTMF signals over a digital voice channel to the DWT 60. In other words, any analog DTMF tones transmitted to the DWT 60 by the opposite party may be encoded by a vocoder (voice coder) in a wireless network switching office so as to generate a digital "fingerprint" of the analog DTMF tones prior to transmission over the digital voice channel interface between the DWT 60 and the wireless network. The DSP 86 may be programmed so that after demodulation by the DWT data demodulator 96, the DSP 86 extracts corresponding analog DTMF tone from each encoded DTMF tone received from the wireless network switching office. Each analog DTMF tone may then be sent to a DWT DTMF decoder 62, which, in turn, forwards a decoded signal over a DWT DTMF decoder output bus 104 carrying information whether the received DTMF signal is one of the ten keypad digits (digits "0" through "9") or one of the two keypad symbols (symbols "*" and "#"). The decoding scheme (to extract the analog DTMF tones from digital fingerprints thereof) employed by the DSP 86 may need to correspond to the encoding scheme in the vocoder in the wireless network switching office. In one embodiment, the DWT DTMF decoder output bus 104 may be similar to the AWT DTMF decoder output bus 48 illustrated and discussed hereinbefore with reference to FIGS. 1–2. Furthermore, the DWT DTMF decoder 62 may be external to the DSP 86 as opposed to being part of the DSP 86 as depicted in FIG. 3.

The software stored in a DWT program storage 106 may interact with the DWT microcontroller 88 to "interpret" the signals received over the DWT DTMF decoder output bus 104 and to inform the DWT microcontroller 88 where to store the decoded DTMF digits. Similar to the discussion hereinbefore with reference to FIG. 1, the user of the DWT 60 may choose (via the DWT keyboard 108) to store the telephone number received from the opposite party in the DTMF format in a DWT non-volatile memory storage 66 or to keep it stored in a DWT scratchpad RAM 64 as a default. A DWT display and keyboard interface 110 may transmit user commands and selections to the DWT microcontroller 88, which, in turn, may send appropriate display information to a DWT display 112 to apprise the user of the status (correctly received, temporary storage, permanent storage, etc.) of the received telephone number information and to allow the user to further interact with the DWT microcontroller 88 via the DWT keyboard 108. The DWT microcontroller 88 may be coupled to the DWT program storage 106, the DWT scratchpad RAM 64, the DWT non-volatile memory storage 66 and the DWT display and keyboard interface 110 via a DWT bi-directional signal bus 114 to accomplish desired DTMF decoding and storage functionality. The DWT microcontroller 88 may include a number of logic units or circuit elements (not shown), e.g., one or more temporary storage registers or buffers, bus control logic, control channel information processing unit, etc.

Various functions performed by the software residing in the DWT program storage 106 are described hereinbelow with reference to FIGS. 5–8. It is noted that the DWT program storage 106 and the AWT program storage unit 50 may be part of respective microcontrollers. Further, the program storages 50, 106 may be in the form of read only memories (ROMs). In one embodiment, the software functionality may be implemented through an optional DWT hardwired control logic unit 116 (illustrated in FIG. 3 as a block with broken lines). The hardware implementation of software functionality has been discussed hereinbefore with reference to FIG. 1, and, therefore, not repeated here.

Further, the DSP 86 may perform the functions of the DWT microcontroller 88, thereby eliminating the need for a separate microcontroller 88. The DWT non-volatile memory storage 66 may be an EEPROM, similar to the AWT non-volatile memory storage 16. Thus, except for the DSP 86 and the CODEC unit 98, the functionality of the DWT 60 may be considered substantially similar to that of the AWT 10. Hence, it is noted that the discussion given hereinbelow with reference to FIGS. 5–8 may be construed to apply to both the AWT 10 and the DWT 60. Additionally, any discussion omitted hereinbefore with reference to FIG. 3 (to prevent repetition), but given with reference to FIGS. 1 and 2 may apply, as appropriate, to the DWT 60 in FIG. 3.

Figure 4:
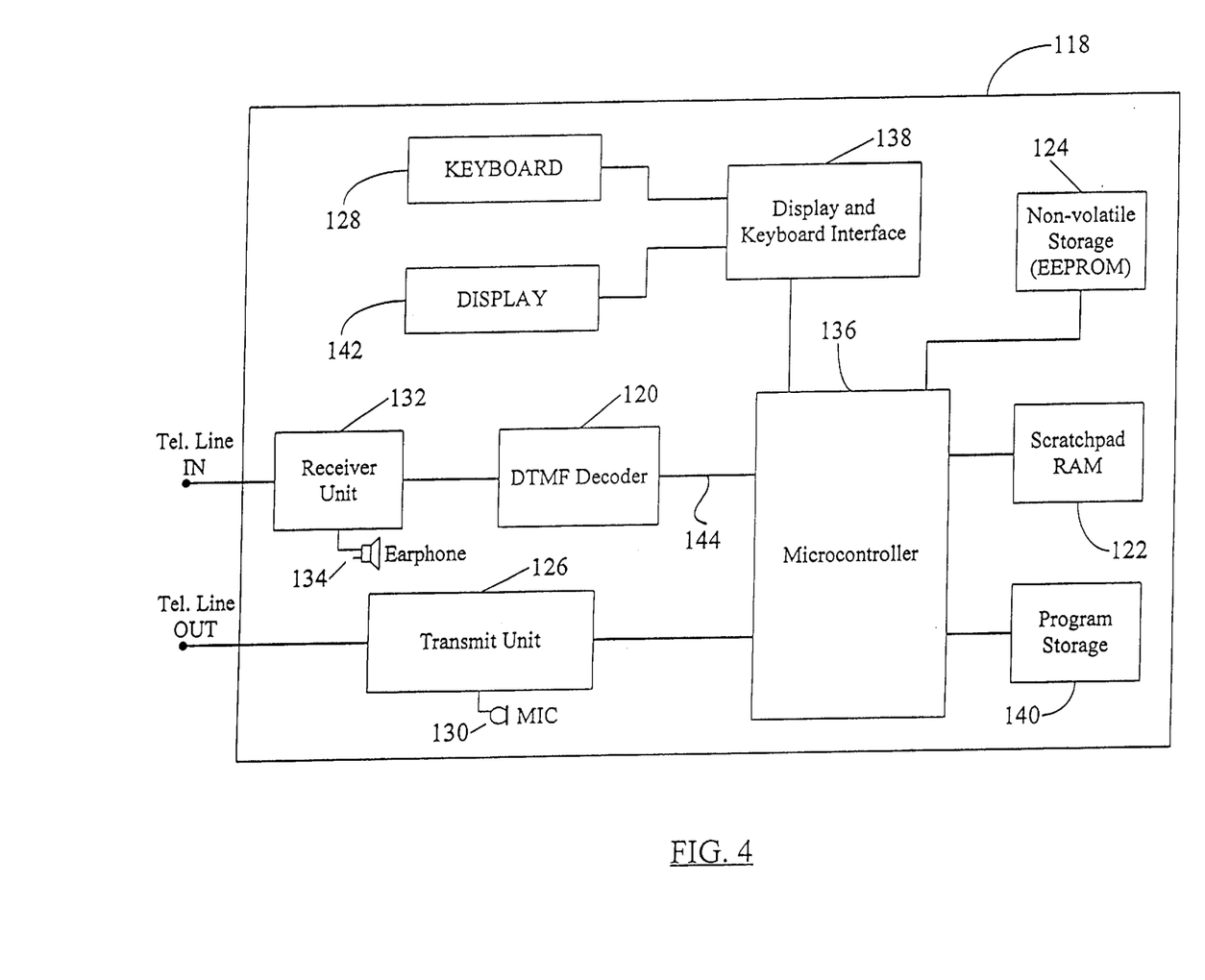
FIG. 4 is a simplified internal block diagram of a wireline telephone having built-in DTMF decoder and memory storage to automatically capture and store DTMF digits received by the phone.

FIG. 4 is a simplified internal block diagram of a wireline telephone (WLT) 118 having built-in WLT DTMF decoder 120 and WLT memory storage such as a WLT scratchpad RAM 122 and a WLT non-volatile memory storage 124 to automatically capture and store DTMF digits received by the WLT 118. The WLT 118 is connected to a telephone line 125, which, in turn, connects the WLT 118 to a telephone switching office (e.g., in a typical public switched telephone network) as part of a subscriber loop. The WLT 118 may include a two-wire-to-four-wire hybrid (2/4 wire hybrid) 123 that splits the telephone signals in a two-wire system within the WLT 118 into a four-wire system supported by the telephone switching office to allow, for example, reduction in signal propagation losses, especially over a long-distance telephone communication. The 2/4 wire hybrid 123 may be directly connected to the telephone line 125 as illustrated.

A transmit unit 126 in the WLT 118 may be connected to the telephone line 125 via the hybrid 123 and may include a pulse/tone dialer (not shown) to transmit the digits (and/or symbols) dialed by the user with a WLT keyboard 128 over the telephone line 125. A DTMF encoder 127 may encode digits (and/or symbols) dialed by the user into corresponding DTMF audio tones before they are sent over the telephone line 125 by the tone dialer (not shown) in the transmit unit 126. The transmit unit 126 may also include a microphone 130 to transmit user voice over the outgoing telephone line 125 connected thereto. A receiver unit 132 is shown connected to the telephone line 125 via the hybrid 123 to receive any DTMF digits and/or symbols transmitted by the opposite party during conversation with the user of the WLT 118. The receiver unit 132 may include an earphone 134 to provide to the user a means to listen to the conversation. It is noted that the WLT 118 may be a regular desktop version of a telephone or may be a cordless telephone or a telephone functionality implemented through a computer system.

A WLT microcontroller 136 may function similarly to the AWT microcontroller 40 to manage information flow between various circuit elements, e.g., a WLT display and keyboard interface 138, a WLT non-volatile memory storage 124, a WLT scratchpad RAM 122 and a WLT program storage unit 140, when one or more decoded DTMF digits are to be stored under program control with possible user interaction via the WLT keyboard 128 and a WLT display 142. The WLT microcontroller 136 may also include a number of logic units or circuit elements (not shown), e.g., one or more temporary storage registers or buffers, bus control logic, etc. The WLT DTMF decoder 120 may decode, in a manner similar to that described earlier with reference to the AWT DTMF decoder 12 in FIGS. 1 and 2, each DTMF signal and may transmit a decoded signal over a WLT DTMF decoder output bus 144 to the WLT microcontroller 136.

It is noted that the discussion presented hereinbefore with reference to FIGS. 1–2 regarding the decoding and storage of received DTMF digits equally applies to the DTMF decoding performed by the WLT 118 (with the help of the built-in WLT DTMF decoder 120) while the user is engaged in a conversation with the opposite party. Therefore, additional discussion in that regard is omitted herein to avoid repetition. It is further noted that the discussion given hereinbelow with reference to FIGS. 5–8 also applies to the functions performed by the software residing in the WLT program storage unit 140. The software in the WLT program storage unit 140 may manage the reception and storage of received DTMF digits upon decoding thereof by the WLT DTMF decoder 120 as illustrated hereinbelow with reference to FIGS. 5–8. Further, in one embodiment, the WLT program storage unit 140 may reside within the WLT microcontroller 136. Additionally, the DTMF decoder software in the WLT program storage unit 140 may be a part of the larger program code resident within the WLT 118 to control its overall operation.

Turning now to FIGS. 5–8, the program flow for automatic number capture operation is depicted. FIGS. 5–8 are considered together herein for the sake of clarity of the discussion. The terms "microcontroller software" or "software" are interchangeably referred to hereinbelow and are meant to include the DTMF decoding and recognition software as part thereof. It is noted that the circuit element "buffer" mentioned in FIGS. 5–8 is considered to be present in respective microcontroller 40, 88 or 136 (although not shown in FIGS. 1, 3 and 4 respectively. Similarly, the term "scratchpad RAM" mentioned in FIG. 8 may refer to any of the previously mentioned scratchpad RAM 14, 64 or 122 in the corresponding phone 10, 60 or 118. Further, the term "phone" is used in FIGS. 5–8 and in the discussion below for the sake of clarity of the discussion and without any reference to any particular embodiment depicted in FIGS. 1, 3 or 4 hereinbefore. However, it is noted that the discussion given hereinbelow applies to all of the telephones described hereinbefore with reference to FIGS. 1, 3 and 4.

Figure 5:
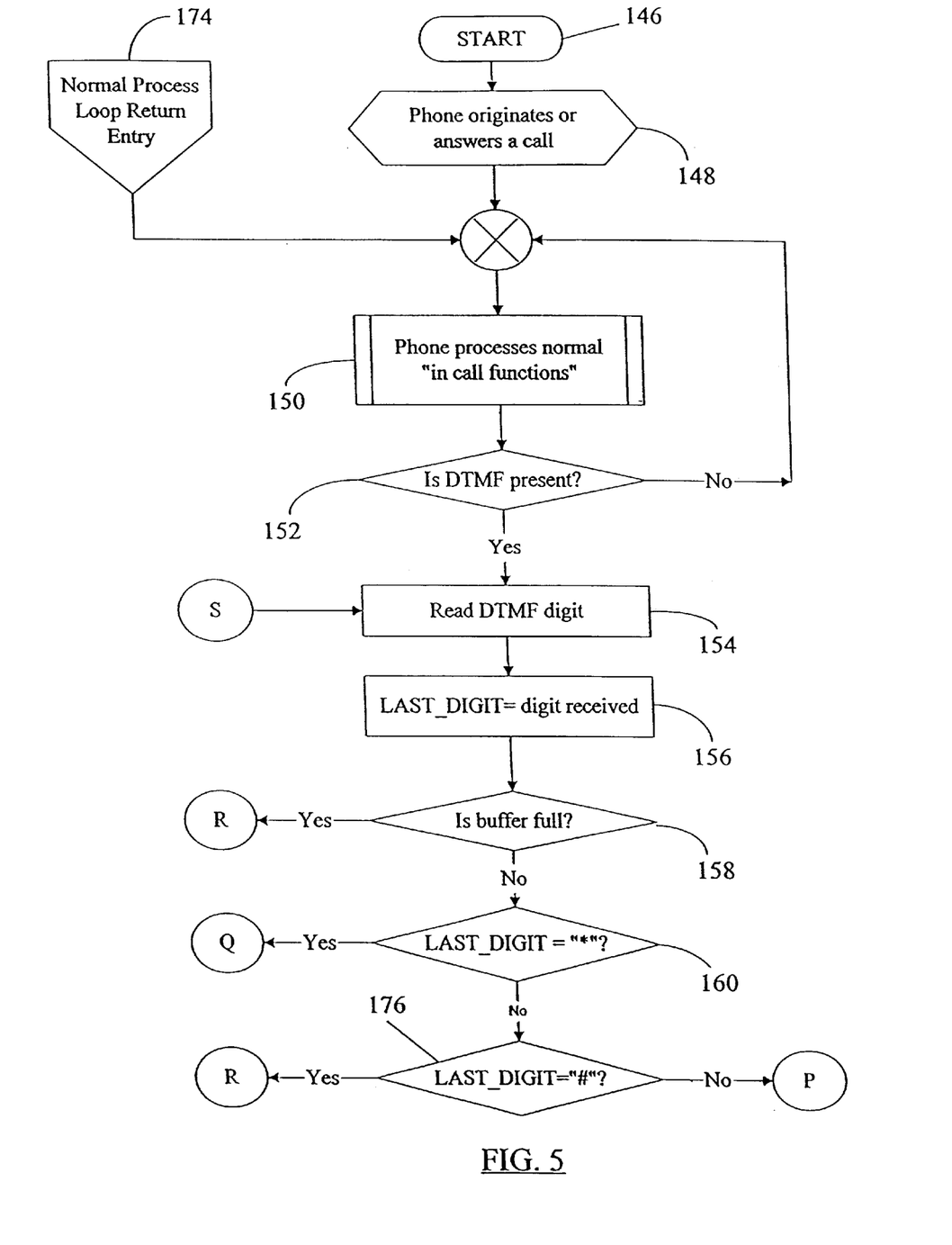
FIGS. 5–8 depict the program flow for automatic number capture operation.

The program flow starts at step 146. Once the phone enters into its conversation mode at step 148 by originating or answering a telephone call placed by another party, the phone continues processing normal "in call" functions as depicted at block 150. Typical "in call" functions include transmission and reception of voice signals by the phone and display of relevant information (e.g., dialed phone number). At step 152, the microcontroller software queries the corresponding DTMF decoder to check whether any DTMF signal is received. In the event of non-receipt of a DTMF signal, the software continues monitoring the DTMF decoder until it receives an indication that a DTMF digit has been received. It is noted that the term "DTMF digit" as used hereinafter refers to either a DTMF digit (digits "0" through "9") or a DTMF symbol (symbols "*" and "#") as the case may be. The software "reads" or "interprets" the DTMF digit received by the corresponding DTMF decoder at step 154 and assigns the DTMF digit to a variable parameter called "LAST_DIGIT" at step 156. The software then checks at step 158 a temporary storage register space, also referred to as "buffer", within corresponding microcontroller to determine whether it is full. The size of a typical buffer within a microcontroller may be equal to the size of one row of the corresponding scratchpad RAM.

Figure 8:
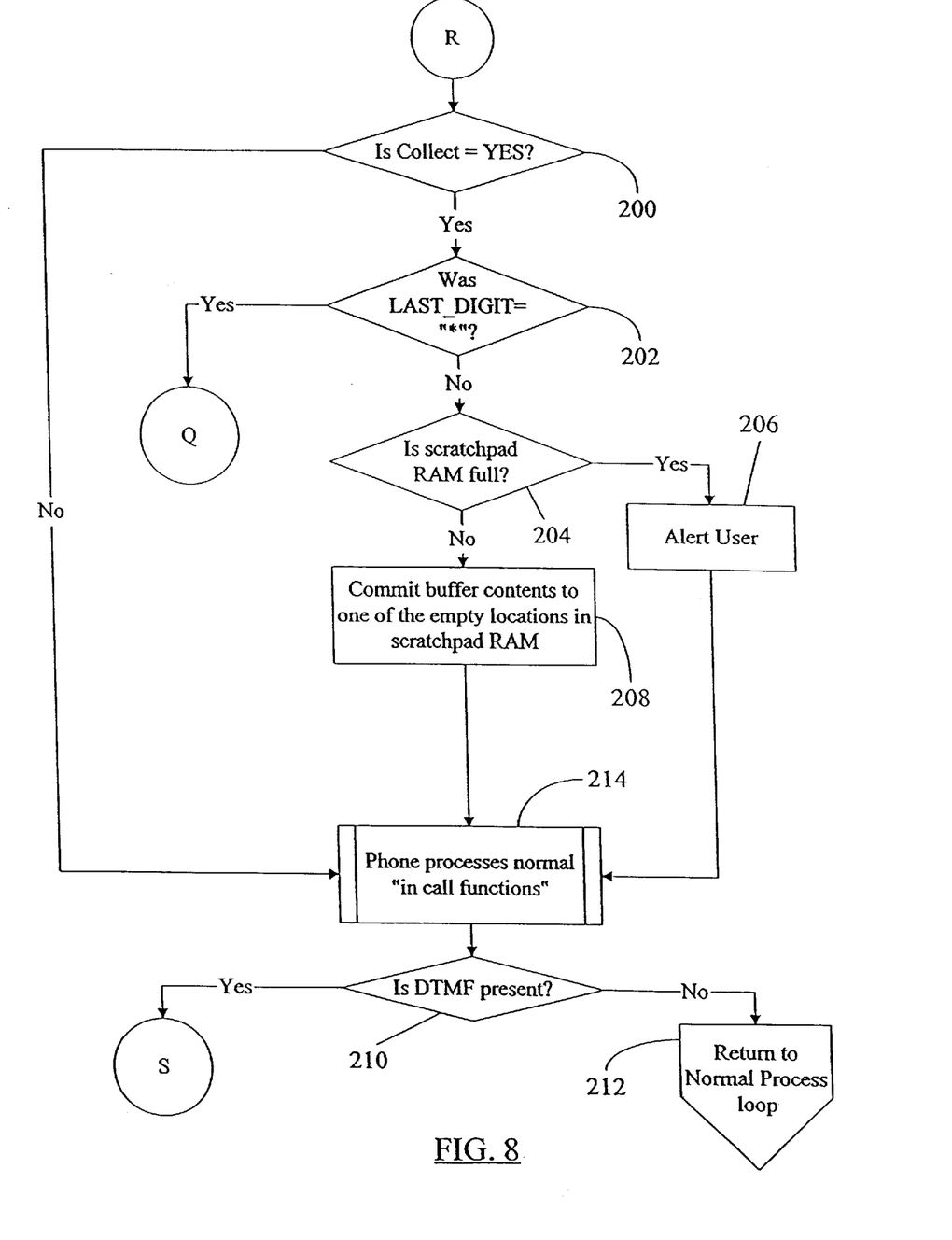

If the program detects that the corresponding microcontroller buffer is full, then the software branches to a program portion denoted by letter 'R' and depicted in FIG. 8. If the buffer is not full, then the program next checks at step 160 whether the most recently received digit, i.e., the digit assigned to the LAST_DIGIT variable is a "*" symbol. In one implementation, the opposite party may first need to indicate, in a predetermined way, to the microcontroller software residing in the user's phone that the DTMF number capture functionality has been invoked by that party. One such predetermined way to convey this information is to transmit the "*" symbol in DTMF form so that the microcontroller software may recognize the "*" symbol as an indication to start storing the DTMF digits (e.g., for the telephone number requested by the user of the phone) that follow after the initially transmitted "*" symbol.

Figure 7:
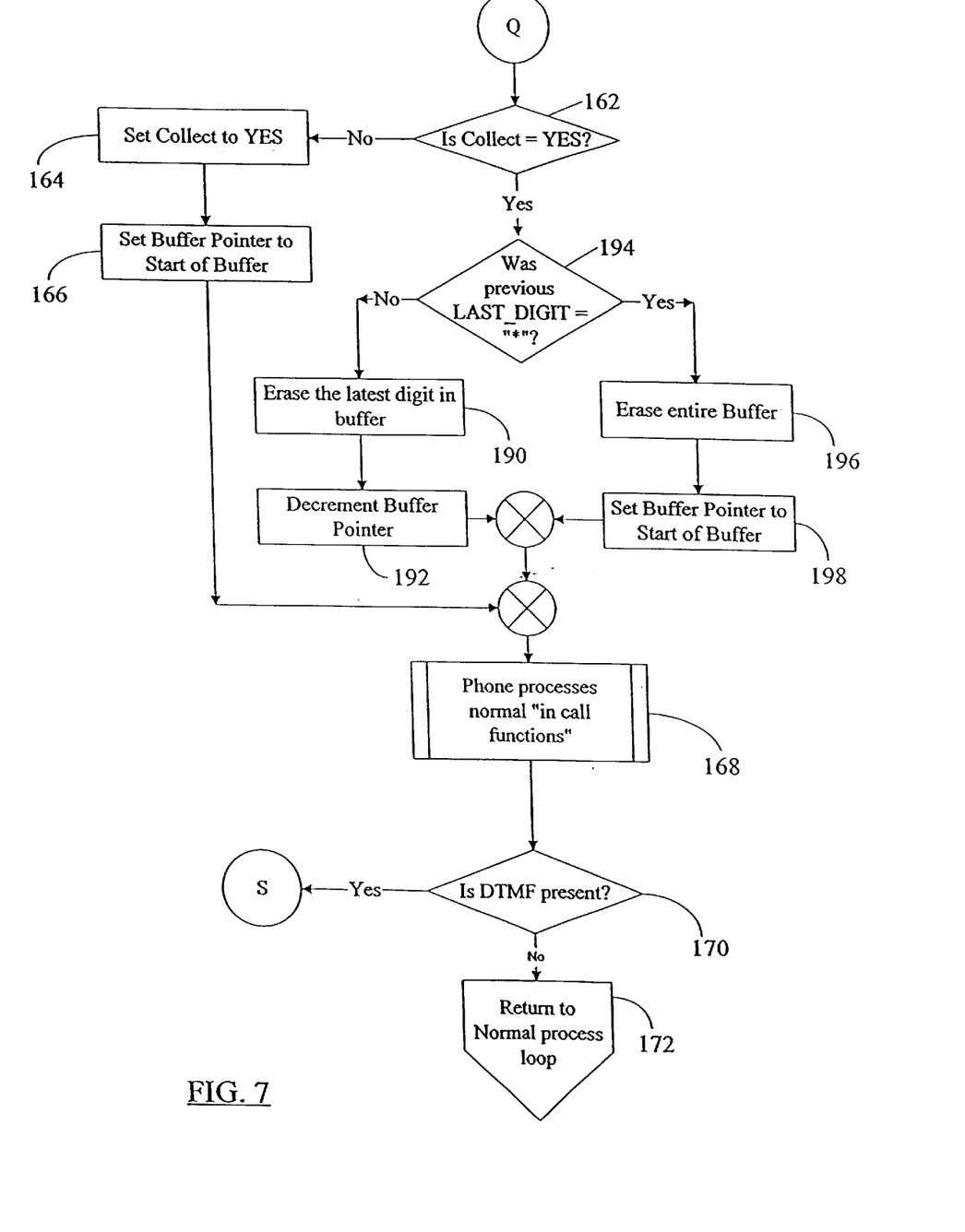

If LAST_DIGIT="*", then the software branches to execute another program portion denoted by letter 'Q' and depicted in FIG. 7. Turning now to FIG. 7, the software determines at step 162 whether the value of a boolean variable—the "Collect" variable—is set to "YES". The value of the Collect variable is set to "YES" when the opposite party initiates DTMF digit transmission by sending the first indication thereof, i.e., the "*" symbol. Hence, when the very first "*" symbol is received, the Collect variable will not have the value "YES". Therefore, the software sets the value to "YES" at step 164 and initializes a buffer pointer at step 166 to point to the first location (or, the start position) in the buffer because the buffer will be empty initially in the absence of any DTMF digits to store. The phone remains in its conversation mode and continues processing normal "in call" functions as depicted at block 168. However, the software continues checking at step 170 for any DTMF digits following the initial transmission of the "*" symbol and upon detection of another DTMF digit, the software jumps to the program section denoted by letter 'S' and depicted in FIG. 5. The software then continues reading and further processing of the received DTMF digit as shown in FIG. 5. However, in the absence of any DTMF digit, which may occur in many situations, for example, when the opposite party decides to abort the transmission or when the transmission is complete or when the telephone connection between the user of the phone and the opposite party is not maintained, etc., the software executes a return command to enter the normal process loop at step 172. Upon its return, the software enters the normal process loop at step 174 (FIG. 5) and continues monitoring receipt of DTMF digits as long as the phone is in the conversation mode as depicted by the flowchart in FIG. 5.

Turning back to FIG. 5, the detection of another DTMF digit leads the software to the entry point 'S' where the software again reads the received DTMF digit at step 154 and assigns it to the LAST_DIGIT variable at step 156. As long as the buffer in the corresponding microcontroller is not full, the software continues to determine whether the received digit is a "*" at step 160 or a "#" at step 176. After the initial DTMF transmission of the "*", the opposite party may start sending other DTMF digits for the phone number or any other numerical information requested by the user of the phone. Therefore, the LAST_DIGIT will not have a "*" or a "#" assigned to it. The software then enters the program section denoted by letter 'P' and depicted in FIG. 6.

Figure 6:
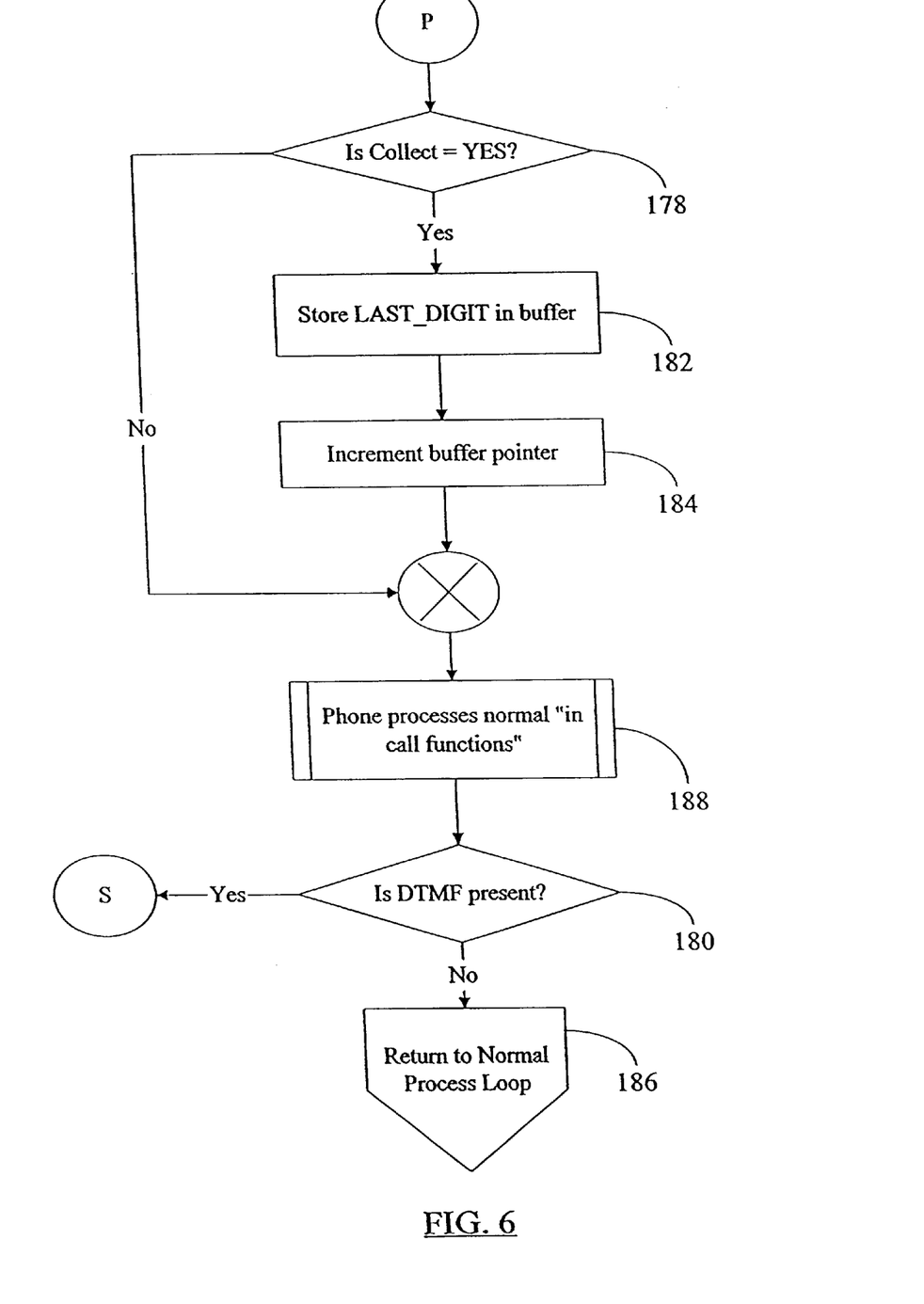

Referring now to FIG. 6, the software initially checks at step 178 whether the Collect variable is set to "YES". If the Collect variable is not set to "YES", then the software continues looking for appropriate DTMF digit (e.g., the symbol "*") at step 180 that may indicate to the software to proceed with storing of subsequent DTMF digits. However, in the present example, the initial reception of the "*" symbol will have set the Collect variable to "YES" (as discussed hereinbefore with reference to FIG. 7) and therefore the software proceeds to store at step 182 the most recently received DTMF digit (as indicated by the value of the LAST_DIGIT variable) in a buffer location indicated by the buffer pointer, which, in the case of the first non-symbol DTMF digit, will be the first or starting location in the buffer. The buffer may store each entry starting from the left-most location or from the right-most location depending on the design convention. The software increments the buffer pointer at step 184 to point to the next empty location in the buffer and continues monitoring presence of any additional DTMF digits (at step 180) or returns to the normal process loop (at step 186) as the case may be. The phone, however, still remains in its conversation mode and continues processing normal "in call" functions as depicted by block 188. The microcontroller number capture software thus keeps storing each non-symbol DTMF digit received (i.e., digits "0" through "9") until one of the following three conditions occurs: (1) The buffer gets full, or (2) Another "*" symbol is received, or (3) A "#" symbol is received.

Referring again to FIG. 5 and assuming that the buffer is still not full and the software has already detected one "*" followed by a few DTMF digits. Now, when the software detects reception of another "*" at step 160, the software jumps to execute the program portion denoted by letter 'Q' and depicted in FIG. 7. In one embodiment of the present invention, the opposite party may be allowed to enter another "*" either to delete (from the buffer) the last digit sent to the user phone or to delete the entire content of the buffer.

Turning now to FIG. 7, if the opposite party makes a mistake in sending the requested telephone number or other numerical information, that party may press the "*" key on its keypad after sending the wrong digit, and the microcontroller software will erase at step 190 the last digit stored in the buffer and will decrement the buffer pointer at step 192 so that the correct digit may be saved in the position of the last, wrong digit. However, if the opposite party wants to delete the entire buffer and start storing digits afresh, then a second "*" may be sent immediately following the "*" that erased the latest digit in the buffer at step 190. In such a situation, the software determines at step 194 that the previous DTMF digit was a "*" and the present DTMF digit is also a "*". Therefore, the software erases the entire buffer at step 196 and sets at step 198 the buffer pointer again to the starting position in the buffer. In short, the software interprets any two consecutive DTMF receptions of the "*" symbol as an indication to empty the content of the buffer in the corresponding microcontroller.

After erasing the last entry in the buffer or the entire buffer, the software proceeds to check for any subsequent reception of a DTMF digit at step 170. If the opposite party sends additional non-symbol DTMF digits to be stored in the buffer, then the software executes the program portion denoted by letter 'S'. Otherwise, the software returns at step 172 to its normal processing to monitor corresponding DTMF decoder to check whether any DTMF signal has been received therein. The phone, as noted hereinbefore, remains in its conversation mode as long as the user is conversing with the opposite party and the phone continues processing its normal "in call" functions as denoted by block 168 in FIG. 7.

Referring again to FIG. 5, it is depicted therein that the software jumps to execute a program portion denoted by letter 'R' when the software finds the buffer full during its inquiry at step 158 or the LAST_DIGIT variable indicates at step 176 that the symbol "#" is the most recently received DTMF digit. The flowchart for the program portion denoted by letter 'R' is depicted in FIG. 8.

Turning now to FIG. 8, it is noted that the buffer gets full when there is an initial reception of a "*" (which sets the Collect variable to "YES" value) and subsequent reception of DTMF digits until the buffer becomes full. It is additionally noted that the opposite party may transmit a "#" symbol in the DTMF form when it intends to save the user-requested numerical information in the corresponding scratchpad RAM in the user's phone. In other words, a "#" indicates to the software that the received and decoded DTMF digits may be transferred from their temporary location in the buffer in the corresponding microcontroller to the corresponding scratchpad RAM for the user to access them at a later time.

The opposite party may transmit a "*" when the buffer is full. In that event, the Collect variable will be "YES" at step 200 (in view of the previous "*") and the software jumps to execute the program section denoted by letter 'Q' and discussed hereinbefore with reference to FIG. 7 after making an affirmative decision at step 202. Additionally, the opposite party may transmit the "#" symbol when the buffer is full or may continue sending more non-symbol DTMF digits even though the buffer is full or may send nothing (not even the "#" symbol) after completely loading the buffer with requested numerical information. In case of any of these events, the software first determines at step 204 whether there is any space in the corresponding scratchpad RAM to store the buffer content. If upon inquiry to the corresponding microcontroller the software finds that the respective scratchpad RAM is full, then the software may instruct the microcontroller to visually alert the user at step 206, e.g., by displaying a "TEMPORARY MEMORY FULL" message on the display in the phone. The microcontroller may also send an accompanying audible sound to alert the user.

The visual and/or audible alert may prompt the user to instruct the microcontroller whether the user wishes to move the current buffer content or another selected location(s) within the scratchpad RAM to corresponding permanent (non-volatile) memory storage in the phone. The user may then input the desired action via corresponding keypad and display in the phone. The user may also select deletion of certain scratchpad RAM contents and may then instruct the microcontroller to store the current buffer content to one of those empty locations in the scratchpad RAM. The user may retrieve at any later time the stored telephone numbers or numerical information from the phone memory. Further, the permanent memory in the phone may keep such numbers and numerical information stored therein for repeat use and reference by the user. The microcontroller software may also allow the phone user to place a call to the received telephone number by dialing that number from its storage location (the buffer, the scratchpad RAM or the non-volatile memory storage) in the phone, i.e., without the user manually dialing the complete number.

It is observed that in the absence of any user input and in the event that the scratchpad RAM is full, the software may instruct the microcontroller to store any additional DTMF digits (i.e., digits received while the buffer is full in the microcontroller) into an overflow buffer location (if provided within the microcontroller) or to ignore any subsequently received DTMF digits. Alternately, the software may instruct the microcontroller to overwrite the buffer content with the additional DTMF digits, starting with the first storage location within the buffer. In one embodiment, the software may instead overwrite (with the buffer content) that location in the scratchpad RAM which was written the earliest. Thus, the scratchpad RAM may function like a set of memory locations organized in a circular queue with the first oldest location being overwritten first, the second oldest location being overwritten next, and so on.

In the event that the software finds an empty location within the scratchpad RAM (without any overwriting action), the software instructs corresponding microcontroller to commit all digits stored in the buffer to that empty location within respective scratchpad RAM at step 208 when the software detects that either the buffer is full and/or a "#" is received from the opposite party. Upon completion of the data storage at step 208, the software proceeds with its routine monitoring of receipt of a DTMF digit at step 210 or its return to the normal process loop at step 174 (FIG. 5) via step 212. The phone, as usual, continues processing its normal "in call" functions so long as the user is conversing with the other party as denoted by block 214 in FIG. 8.

The foregoing describes exemplary embodiments of wireless and wireline telephones that are configured to include a DTMF decoder unit, its operating software and corresponding memory storage to capture and store telephone numbers or numerical information transmitted as DTMF digits during the conversation mode of those phones. A telephone embodying the present invention thus captures for its user DTMF digits without requiring the user to disrupt his/her conversation, e.g., by searching for a paper and pen. Thus, the user may not need to personally remember or write down the telephone number or numerical information received while the user is on phone with the other party. The DTMF decoder software may also allow the phone user to place a call to the captured telephone number by directly dialing that number from its storage location in the phone, i.e., without the user manually entering the complete number.

While several preferred embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A wireless telephone comprising:
    a receiver to receive a DTMF (dual tone multi-frequency) audio tone indicative of dialed information from an opposite party and transmitted to the wireless telephone during a conversation mode of the wireless telephone;
    a DTMF decoder coupled to the receiver to decode the DTMF audio tone and to responsively generate a decoded signal representing the dialed information during the conversation mode of the wireless telephone;
    a control unit coupled to the DTMF decoder to determine the dialed information from the decoded signal during the conversation mode of the wireless telephone;
    a memory coupled to the control unit to receive the dialed information therefrom, wherein the memory is configured to store the dialed information therein in response to one or more instructions received from the control unit during the conversation mode of the wireless telephone; and
    a program storage unit coupled to the control unit, wherein the program storage unit stores a software module which, when executed by the control unit, causes the control unit to operate on the decoded signal to determine the dialed information therefrom during the conversation mode of the wireless telephone and to manage storage of the dialed information in the memory during the conversation mode of the wireless telephone.

2. The wireless telephone of claim 1, wherein the DTMF audio tone is selected from the group consisting of DTMF audio tones for "0", "1", "2", "3", "4", "5", "6", "7", "8", "9", "*", and "#".

3. The wireless telephone of claim 1, wherein the decoded signal includes a plurality of bits.

4. The wireless telephone of claim 1, wherein the memory is a volatile memory.

5. The wireless telephone of claim 4, wherein the volatile memory is a scratchpad RAM.

6. The wireless telephone of claim 1, wherein the memory is a non-volatile memory.

7. The wireless telephone of claim 1, further comprising a keyboard coupled to the control unit, wherein the software module, when executed by the control unit, causes the control unit to interpret a command received from the keyboard and to manage the storage of the dialed information in the memory according to the command.

8. The wireless telephone of claim 1, further comprising a display coupled to the control unit, wherein the control unit causes the display to display the dialed information during the conversation mode of the wireless telephone.

9. The wireless telephone of claim 1, wherein the receiver includes:
- an RF (radio frequency) antenna to receive an RF signal carrying the DTMF audio tone in an analog modulated form;
- an RF amplifier coupled to the RF antenna to provide needed amplification to the RF signal received by the RF antenna; and
- an analog demodulator coupled to the RF amplifier to demodulate the RF signal to retrieve the DTMF audio tone therefrom.

10. The wireless telephone of claim 1, wherein the receiver includes:
- an RF (radio frequency) antenna to receive an RF signal carrying the DTMF audio tone in an encoded/modulated form;
- an RF amplifier coupled to the RF antenna to provide needed amplification to the RF signal received by the RF antenna; and
- a data demodulator coupled to the RF amplifier to demodulate the RF signal to retrieve therefrom the DTMF audio tone in an encoded form.

11. The wireless telephone of claim 10, further comprising a digital signal processor (DSP) coupled to the receiver, wherein the DSP includes the DTMF decoder, and wherein the DSP is configured to process the DTMF audio tone in the encoded form to remove encoding therefrom before the DTMF decoder receives the DTMF audio tone.

12. A telephone comprising:
- a receiver to receive a DTMF (dual tone multi-frequency) audio tone from an opposite party indicative of a telephone keypad entry entered by the opposite party and transmitted to the telephone during a conversation mode thereof;
- a DTMF decoder coupled to the receiver to decode the DTMF audio tone and to responsively generate a decoded signal representing the telephone keypad entry during the conversation mode of the telephone;
- a control unit coupled to the DTMF decoder to determine the telephone keypad entry from the decoded signal during the conversation mode of the telephone;
- a memory coupled to the control unit to store therein the telephone keypad entry during the conversation mode of the telephone; and
- a program storage unit coupled to the control unit, wherein the program storage unit stores a software module which, when executed by the control unit, causes the control unit to operate on the decoded signal to determine the telephone keypad entry therefrom during the conversation mode of the telephone and to manage storage of the telephone keypad entry in the memory during the conversation mode of the telephone.

13. The telephone of claim 12, wherein the receiver is configured to receive the DTMF audio tone from a telephone line.

14. The telephone of claim 12, wherein the receiver is configured to receive the DTMF audio tone from a wireless network.

15. The telephone of claim 12, further comprising a keyboard coupled to the control unit, wherein the software module, when executed by the control unit, causes the control unit to interpret a command received from the keyboard and to manage the storage of the telephone keypad entry in the memory according to the command.

16. The telephone of claim 12, further comprising a display coupled to the control unit, wherein the control unit causes the display to display the telephone keypad entry during the conversation mode of the telephone.

17. The telephone of claim 12, wherein the memory is a volatile memory.

18. The telephone of claim 17, wherein the volatile memory is a scratchpad RAM.

19. The telephone of claim 12, wherein the memory is a non-volatile memory.

20. A method of receiving numerical data in a telephone comprising: receiving the numerical data from an opposite party in a DTMF (dual tone multi-frequency) form during a conversation mode of the telephone; decoding the numerical data received in the DTMF form during the conversation mode thereof; and storing the numerical data in the telephone during the conversation mode thereof using: a control unit coupled to a DTMF decoder to determine dialed information from a decoded signal; a memory coupled to the control unit to receive the dialed information therefrom, wherein the memory is configured to store the dialed information therein in response to one or more instructions received from the control unit; and a program storage unit coupled to the control unit, wherein the program storage unit stores a software module which, when executed by the control unit, causes the control unit to operate on the decoded signal to determine the dialed information therefrom and to manage storage of the dialed information in the memory.

21. The method of claim 20, further comprising displaying the numerical data during the conversation mode of the telephone.

22. The method of claim 20, wherein storing the numerical data includes:
- receiving a command through a keypad on the telephone; and
- configuring the telephone to store the numerical data therein in response to the command received.

* * * * *